June 22, 1943. T. F. PETERSON 2,322,702
SHIELDED CABLE
Filed June 24, 1929
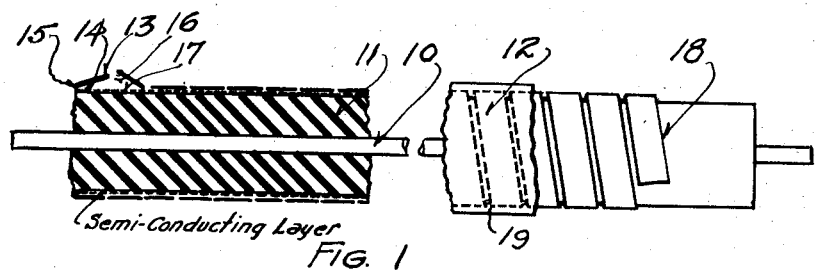
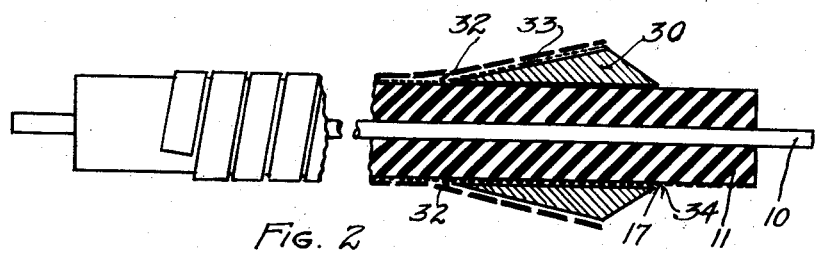
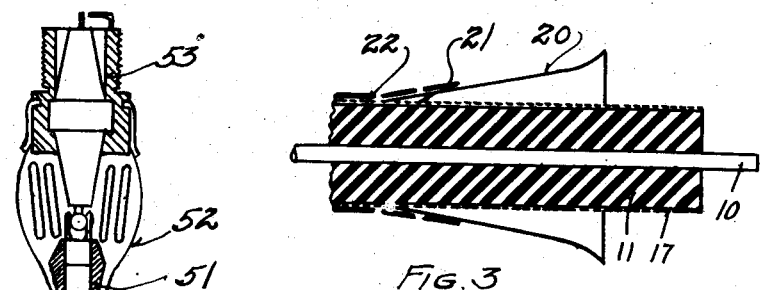
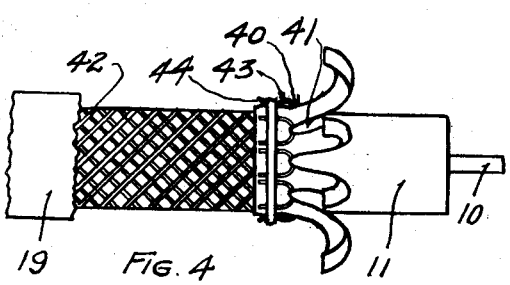
INVENTOR
*Thomas F. Peterson*
BY
*Jos. N. Nielsen*
ATTORNEY Patented June 22, 1943

2,322,702

UNITED STATES PATENT OFFICE 2,322,702

SHIELDED CABLE

Thomas F. Peterson, Brooklyn, N. Y.

Application June 24, 1929, Serial No. 373,181

19 Claims. (Cl. 174—106)

This invention relates to shielded electric cables intended for high voltages. The term "shielded" is used in the art in two senses. One sense frequently intended is a confinement of action (electrostatic, magnetic or electromagnetic) of the conductor, as for example the shielding of aeroplane ignition cables to prevent external radio interference or protection of the cable from the influence of the systems external thereto. The other usage refers to a protection of the cable itself from the action of deleterious agents or disturbances. It is in the latter sense that the term is primarily used in high voltage cable engineering, though the problems that arise are the same irrespective of the purpose for which the shielding is designed.

The invention has application to cables with various insulations and designed for widely differing services. Cables consist for the most part of copper conductors, solid or stranded, that are insulated with rubber, varnished cambric or impregnated paper and have over all a protective covering to prevent injury to the insulation, etc. Armor or lead sheaths are commonly employed as shieldings, or when these are absent thin metal tape, braid or wrapping of wire are used but even lead-covered cables may include a thin metal tape, applied directly about the insulation; pipes or hollow metal tubes are also made use of for this purpose. Any cable having a conducting outer covering or sheath which may be grounded to carry off charging currents without the development of excessive potential may be said to be shielded. Such grounded conducting elements carry charging current to ground or to the source.

With low voltages shielding is ordinarily of little moment. But as the voltages are increased electrical stresses of increasing magnitude are set up in the insulating substance about the conductor, such as rubber, paper or varnished cambric, which in turn may be surrounded by air or some other insulation; these stresses are proportionate to the electrostatic lines of force which emanate from the conductor and traverse the insulating substances to terminate at some other conductor of differing potential. The potential gradients thereby established in various parts of the electrostatic circuit depend on the configuration of the conducting body, the length of the paths and the relative specific inductive capacities (S. I. C.) of the insulating materials.

The potential gradients in a dielectric circuit can be computed by the use of known formulae. In the case of a uniform field it is approximately equal to the voltage drop divided by the thickness of the insulation. Where there is an appreciable length of an air path in addition to the path in the solid insulation, as in the case for example where shielding is absent, the flux density in the air is the same as in the solid insulation adjacent to it, and the potential gradient in the air is equal to the product of the gradient in the solid insulation and the ratio of the S. I. C. of the solid insulation to the S. I. C. for air which is 1. Inasmuch as most of the solid insulations have high values (from 3 to 6 or 7) of S. I. C., it is evident that the stresses in the air may be from 3 to 6 or 7 times that in the immediately adjacent solid insulation. For this reason where the total path is short and the stress in the solid insulation is therefore high, the stresses in air are often great enough to result in a breakdown, that is, to cause ionization and the formation of ozone. Ozone is a very active oxidizing agent and attacks most insulating materials in use at the present time. In the case of oil-impregnated paper-insulated cable deterioration which follows as a result of electrical stress in the presence of such a discharge takes the form of wax development gas evolution and carbonization. Rubber which is a very commonly used insulating material is very quickly oxidized, and wherever it is under any mechanical stress in addition it cracks with great rapidity.

It frequently happens that, though the cable is shielded with metal tape, a lead sheath, or some braided or wrapped wire to form a protecting veil or gauze and so presumably confining stress to the insulation body, the metal covering is not in its entirely in intimate contact with the insulation over which it is applied and thus there is formed a short air path in series with the insulation between the conductor and the conductive covering. High electrical stresses of the nature described above are therefore caused when a high potential is impressed on the conductor. This has been demonstrated in actual practice by taking heavily insulated cables having copper tape shields; with all portions of the tape in tight contact with the insulating material the cables have lasted for thousands of hours under high voltages, but when a small section or an edge of a small portion of the tape has been lifted slightly from the cable insulation failure at this point has resulted under the same voltage within 6 or 7 hours. It is very evident that such a condition involving a slight separation of the insulation from a conductor can readily develop during the handling of the cable; and the termination of the shielding tape or other covering if made without any special precaution leaves an air gap resulting in a high concentration of stress at the edge of the tape to cause a failure. Even where insulation is applied to build up the conductor so that the outer tape can be terminated where the insulation is excessive it often happens that air is included at the point where the shielding bridges the conductor insulation and the applied built up insulation; this is found to be the reason for trouble that is frequently experienced at joints and terminals.

According to the present invention the dangers due to over-stressed entrapped air are eliminated. Furthermore it provides a simplified termination of the shielding at the joints and terminals. These objects are accomplished by introducing between the solid insulation and the usual shielding or metal conductor a coating film or layer of a conductive material on the surface of the solid insulation. Various metals, such as aluminum, etc., graphite and other materials of a more or less conductive nature as hereinafter indicated are suitable for this purpose and they can be applied in various ways. For instance, they can be included in the form of a powder embedded in the surface of the insulating material or in the surface of adhesive tape or equivalent braid or lapping helically wound about or exterior to the insulation or they can be dusted or rubbed in the powder form into the insulation. Other suitable modes of application are spraying a semi-conductive substance on the insulation surface or incorporating graphite, metal powder, etc., in a normally insulating medium, such as a paint or a lacquer, with which the cable insulation is coated. The surface resistivity thus developed can be varied through a wide range depending upon the location. In portions of a cable sufficiently distant from the ends or joints the resistivity may be low or it may be quite high; in fact as the charging current is very small and the average voltage drop as a result is correspondingly small, I have found surface resistivities as high as 100 megohms per square centimeter of area and even more to be suitable. At the joints or terminals a low resistance evidently is not feasible; and a high resistance layer at these portions has the added advantage of making possible a simplified terminal construction as hereafter described.

In the drawing accompanying this description:

Figure 1 illustrates a cable including the terminal portion wrapped with shielding tape, the view being partly in cross section;

Figure 2 is a view similar to Figure 1 but illustrates a modified built-up cable end;

Figure 3 is a cross section of a modified terminal;

Figure 4 is a view showing another modification of a cable end; and

Figure 5 is a sectional view through a spark plug and attached cable and showing a continuous shielding extending from the spark plug to the cable shielding.

The cable selected for the purpose of disclosure is an ignition cable and is shown in Fig. 1 as comprising the conductor 10 surrounded by the solid rubber insulation 11. About the insulation is wrapped the shielding tape 12, and over the tape is a sheath 19. The tape at various points along the cable may be sprung from the insulation or may have one edge separated as at 13, thus creating a small air gap 14 of increasing size as measured from the contacting edge 15. As heretofore explained stresses are developed in such an air gap and to prevent over-stressing, a leakage is provided for the charging current, that is, the drop in potential along the insulator surface beneath the tape portion 13—15 is made less than that which results in a breakdown of the air gap by the provision of a conductive surfacing material 17. Where the gap happens to be sufficiently large as at 16 to resist the stress, the surfacing material is not necessary. Evidently there is no limit to the degree of conductivity of such a surface provided it is far enough from the cable ends to avoid short circuiting.

If the shielding tape is terminated abruptly as at 18 in Fig. 1 a concentration of stress results at the edge of the tape and high longitudinal stresses may develop along the surface of the insulation near the tape. It is therefore found desirable to provide a flared metallic end 20 to the shielding as in Fig. 3 or a bell end 40 as in Fig. 4 to secure a more uniform stress distribution. But with a flared or belled end it is difficult to avoid the inclusion of some air at the point 21 which becomes over-stressed and finally breaks down. The provision of a semi-conducting surface 22 which emerges from beneath the shielding and is in intimate contact with the insulation eliminates such difficulties. In such a location the partially conducting surface is made sufficiently high in resistance to avoid such leakage as will result in a flash-over from the conductor.

The terminal construction shown in Fig. 2 includes a built-up insulating body 30. This is used for terminating metallic shields and forms the subject matter of my copending application Serial No. 352,877, filed April 5, 1929, now Patent No. 1,987,971, January 15, 1935. With such a built-up insulation an air gap 32 may be created where a tape shielding bridges from the cable insulation to the applied insulation. The addition of a conducting film as herein described eliminates the possibility of trouble. With this construction it is also found desirable to continue the conductive coating on to or underneath the built-up insulation 30 as at 33 and 34 respectively; an underneath coating is protected from grease and injury and is therefore preferred.

Fig. 4 further illustrates the terminal bell end 40, as provided with slits 41. Such a shield terminal can be crimped about a wire braid shielding 42, for example, and the ends 43 of the wires constituting the shielding pulled through the slots and secured by means of a ring 44.

Figure 5 illustrates a construction wherein the shielding is continued beyond the cable end in order to provide a complete shielding of an ignition system from a distributor to a spark plug. In this case the shielding 50 enclosing the cable is flared by the insertion of a built-up insulation 51 of any suitable material, as shown for example in my copending case, and the conducting film on the cable can be continued on to the insulation as heretofore described. A divergent cylindrical shield 52 surrounds the cable shielding and extends to the spark plug 53 as shown.

The supplementary coating or shielding in accordance with this invention need not be coextensive with the entire length of the cable; and where the usual shielding is considered ample for the intermediate portions, its application may be restricted to the ends. In this case any of the devices employed for the cable proper may also be used to protect the terminals. Where the sheathing consists of a pipe, the invention finds particular application at the bushings where the cable emerges, though it is also desirable to provide the supplementary coating on the cable portions within the pipe on account of the loose contact.

I claim:

1. High tension cable terminal including a conductor, insulation inclosing the conductor, shielding about the insulation terminating short of the end of the insulation in a flared conducting element, said insulation having a semi-conducting layer intimately associated with its surface, said layer emerging from beneath the shielding and extending under said flared conducting element.

2. High tension cable terminal including a conductor, insulation inclosing the conductor, a built up insulation of cone formation about the insulation, shielding about the insulation and the cone-formed insulation, said shielding comprising a semi-conducting layer intimately associated with the first named insulation and extending upon the surface of the cone-formed insulation and a conducting element extending along said insulation and the cone-formed insulation and contacting electrically the semi-conducting layer at intervals.

3. A shielded rubber insulated cable in which ionizable spaces between the rubber and shield are obviated by the use of an adhesive tape located between the rubber insulation and the shield and in contact with the rubber, the outer face of said adhesive tape being covered with metal.

4. The device of claim 3 with the addition of a metal tape over the metallized tape.

5. A shielded rubber insulated cable comprising a core of conducting material, covered with rubber insulation, adhesive tape in contact with the rubber and having an exterior conducting coating, metal shielding tape in contact with the coating whereby the ionizable spaces between the rubber and the shield are obviated, and covered with any mechanical protection.

6. Shielded electric cable comprising in combination a conductor, flexible insulation around the conductor, a semi-conducting layer intimately contacting a surface of the insulation and comprising insulating material containing conducting particles, the contact and essential electrical characteristics of the layer persisting regardless of bending or elastic movement of the insulation, and electrically conducting element along the cable having electrical contact with said layer such as to maintain the electrical potential of any portion of said semi-conducting layer at a value less than that at which break down of the adjacent medium occurs.

7. Shielded electric cable comprising in combination a conductor, a rubber insulation around the conductor, a semi-conducting layer intimately contacting a surface of the insulation and comprising insulating material containing conducting particles, the contact and essential electrical characteristics of the layer persisting regardless of bending or elastic movement of the insulation, and electrically conducting shielding element along the cable having electrical contact with said layer such as to maintain the electrical potential of any portion of said semi-conducting layer at a value less than that at which break down of the adjacent medium occurs.

8. Shielded electric cable comprising in combination a conductor, flexible insulation around the conductor, a semi-conducting layer intimately contacting a surface of the insulation and comprising insulating material containing conducting particles, the contact and essential electrical characteristics of the layer persisting regardless of bending or elastic movement of the insulation, and electrically conducting shielding element along the cable having electrical contact with said layer such as to maintain the electrical potential of any portion of said semi-conducting layer at a value less than that at which break down of the adjacent medium occurs, said shielding element being helically laid about the semi-conducting layer.

9. Shielded electric cable of the non-leaded type comprising in combination a conductor, flexible insulation around the conductor, a semi-conducting layer intimately contacting one surface of the insulation and comprising insulating material containing conducting particles, the contact and essential characteristics of the layer persisting regardless of bending or elastic movement of the insulation, and a metallic shielding tape having a mass conductivity of the order of copper helically laid about the semi-conducting layer and having electrical contact with said layer.

10. An electric cable comprising a rubber insulated conductor, a layer of rubber compound containing conducting particles covering the entire outer surface of the conductor insulation, to provide a layer of conducting compound about and in intimate contact with the said insulation, said conducting compound being grounded to bring the same to earth potential and conduct away the charging current of the insulation.

11. An article of manufacture comprising in combination an electric conductor, an insulating sheath enclosing the conductor, and an electric shield adjacent one surface of the sheath comprising a thin wall of fibrous material covered with a graphite base rubber mixture.

12. In an electric cable comprising in combination a conductor and a body of insulation about the conductor, a semi-conducting layer having intimate contact with one surface of the body of insulation and comprising insulating material having incorporated therein electrically conducting particles, the contact and essential electrical characteristics of the layer persisting regardless of bending or movement of the body of insulation, said layer serving to carry charging current to a contacting conducting element for maintaining the electrical potential of any portion of said semi-conducting layer at a value less than that at which harmful electrical disturbances occur.

13. In an electric cable comprising in combination a conductor and a body of insulation about the conductor, a semi-conducting layer having intimate contact with one surface of the body of insulation and comprising insulating material having incorporated therein electrically conducting carbon particles, the contact and essential electrical characteristics of the layer persisting regardless of bending or movement of the body of insulation, said layer serving to carry charging current to a contacting conducting element for maintaining the electrical potential of any portion of said semi-conducting layer at a value less than that at which harmful electrical disturbances occur.

14. In an electric cable comprising in combination a conductor and a body of insulation about the conductor, a semi-conducting layer having intimate contact with one surface of the body of insulation and comprising a tape wound about the insulation and having incorporated therein electrically conducting particles, the contact and essential electrical characteristics of the layer persisting regardless of bending or movement of the body of insulation, said layer serving to carry charging current to a contacting conducting element for maintaining the electrical potential of any portion of said semi-conducting layer at a value less than that at which harmful electrical disturbances occur.

15. In an electric cable comprising in combination a conductor and a body of insulation about the conductor, a semi-conducting layer having intimate contact with one surface of the body of insulation and comprising insulating material having incorporated therein electrically conducting particles, the contact and essential electrical characteristics of the layer persisting regardless of bending or movement of the body of insulation, said layer serving to carry charging current to a grounded contacting conducting element for maintaining the layer at a value less than that at which harmful electrical disturbances occur.

16. In an electric cable comprising in combination a conductor and a body of insulation about the conductor, a semi-conducting layer having intimate contact with one surface of the body of insulation and comprising insulating material having incorporated therein electrically conducting particles, the contact and essential electrical characteristics of the layer persisting regardless of bending or movement of the body of insulation, said layer serving to carry charging current to a grounded contacting conducting element coextensive in length with the cable for maintaining the layer at a value less than that at which harmful electrical disturbances occur.

17. An electric cable comprising in combination a conductor, a body of insulation about the conductor, a semi-conducting layer having intimate contact with one surface of the body of insulation and comprising insulating material having incorporated therein electrically conducting particles, the contact and essential electrical characteristics of the layer persisting regardless of bending or movement of the body of insulation, a wire contacting said layer to serve for carrying off charging current, and an overlying sheath.

18. An electric cable comprising in combination a conductor, a body of insulation about the conductor, a semi-conducting layer of non-metallic conducting material having intimate contact with one surface of the body of insulation, the contact and essential characteristics of the layer persisting regardless of bending or movement of the body of insulation, a wire contacting said layer to serve for carrying off charging current, and an overlying sheath.

19. An electric cable comprising in combination a conductor, a body of insulation about the conductor, a semi-conducting layer of non-metallic conducting material having intimate contact with one surface of the body of insulation, the contact and essential characteristics of the layer persisting regardless of bending or movement of the body of insulation, a metallic strip contacting said layer to serve for carrying off charging current, and an overlying sheath.

THOMAS F. PETERSON.